(12) United States Patent
Horie et al.

(10) Patent No.: US 10,409,762 B2
(45) Date of Patent: Sep. 10, 2019

(54) REMOTE DIRECT MEMORY ACCESS-BASED ON STATIC ANALYSIS OF ASYNCHRONOUS BLOCKS

(71) Applicant: INTERNATIONAL BUSINESS MACHINES CORPORATION, Armonk, NY (US)

(72) Inventors: Michihiro Horie, Saitama (JP); Hiroshi H. Horii, Tokyo (JP); Kiyokuni Kawachiya, Kanagawa (JP); Mikio Takeuchi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 15/063,770

(22) Filed: Mar. 8, 2016

(65) Prior Publication Data

US 2017/0262405 A1    Sep. 14, 2017

(51) Int. Cl.
*G06F 15/173*    (2006.01)

(52) U.S. Cl.
CPC .............................. *G06F 15/17331* (2013.01)

(58) Field of Classification Search
CPC .......... G06F 3/067; G06F 3/065; G06F 13/28; G06F 15/17331
USPC ....................................................... 709/212
See application file for complete search history.

(56) References Cited

U.S. PATENT DOCUMENTS

| | | | | |
|---|---|---|---|---|
| 5,790,804 | A * | 8/1998 | Osborne | H04Q 11/0478 709/245 |
| 8,924,946 | B2 * | 12/2014 | Bikshandi | G06F 8/458 717/136 |
| 9,959,074 | B1 * | 5/2018 | Shain | G06F 3/065 |
| 2014/0129664 | A1 | 5/2014 | McDaniel et al. | |
| 2015/0012607 | A1 | 1/2015 | Cayton et al. | |
| 2016/0012003 | A1 * | 1/2016 | Chawla | G06F 13/102 710/308 |

OTHER PUBLICATIONS

Yang, E.Z. et al., "Efficient Communication and Collection with Compact Normal Forms"—Proceeding ICFP 2015 Proceedings of the 20th ACM SIGPLAN International Conference on Functional Programming (ICFP) (Aug. 29, 2015) pp. 362-374.
Barik, R. et al., "Communication Optimizations for Distributed-Memory X10 Programs" IEEE International Parallel & Distributed Processing Symposium (IPDPS), (May 16-20, 2011) pp. 1101-1113.
Tardieu, O. et al., "X10 and APGAS at Petascale" Proceedings of the 19th ACM SIGPLAN symposium on Principles and practice of parallel programming (PPoPP) (Feb. 2014) pp. 53-66.

* cited by examiner

*Primary Examiner* — Jerry B Dennison
(74) *Attorney, Agent, or Firm* — Tutunjian & Bitetto, P.C.; Vazken Alexanian

(57) ABSTRACT

Described herein are methods of transferring arrays of data information by remote data memory access (RDMA). The method may include identifying data arrays in a local place that are to be copied to a remote place; and determining whether the data arrays are to be overwritten by analyzing asynchronous blocks from the data arrays in the local place at a start compilation time using a static compiler. The method may further include executing transfer of the data arrays from the local place to the remote place with a pull type RDMA.

20 Claims, 8 Drawing Sheets

US 10,409,762 B2

REMOTE DIRECT MEMORY ACCESS-BASED ON STATIC ANALYSIS OF ASYNCHRONOUS BLOCKS

BACKGROUND

Technical Field

The present invention relates to the copy and transfer of data by remote direct memory access (RDMA), particularly to finding large arrays being copied to remote places, and executing zero-copy with RDMA for transferring such data.

Description of the Related Art

In the X10 programming language (hereinafter "X10"). In computing, remote direct memory access (RDMA) is a direct memory access from the memory of one computer into that of another computer without involving the operating system of either computer. Memory access via RDMA attains high throughput and networking with low latency.

SUMMARY

According to present principles, described herein is a computer-implemented method of copying and transferring arrays of data by remote data memory access (RDMA).

In one embodiment, the present disclosure provides a computer-implemented method of copying and transferring arrays of data by remote data memory access, that includes identifying data arrays in a local place that are to be copied to a remote place. The method may further include determining whether the data arrays are to be overwritten by analyzing asynchronous blocks from the data arrays in the local place at a start compilation time using a static compiler; and executing transfer of the data arrays from the local place to the remote place with a pull type RDMA.

In another aspect, the present disclosure provides a system for transferring arrays of data objects by remote data memory access. In one embodiment, the system may include one or more processors including memory that processes and stores a quantity of data to be copied and transferred from a local place to a remote place; and a static compiler for identifying data arrays in the local place that are to be copied to the remote place, and determining whether the data arrays are to be overwritten by analyzing asynchronous blocks from the data arrays in the local place at a start compilation time using a static compiler. The system may further include a before data copy/transfer unit that flags information from the array that can be overwritten. Further, the system can include a receiving unit for reading flags at the remote place and pulling array data with RDMA based on flag information of whether array can be overwritten.

In yet another aspect, a computer program product is provided for transferring arrays of data by remote data memory access. In one embodiment, the computer program product comprises a non-transitory computer readable storage medium having program instructions embodied therewith. In some embodiments, the program instructions being executable by the computer cause the computer to perform a method that includes identifying data arrays in a local place that are to be copied to a remote place; and determining whether the data arrays are to be overwritten by analyzing asynchronous blocks from the data arrays in the local place at a start compilation time using a static compiler. The method may further include executing transfer of the data arrays from the local place to the remote place with a pull type RDMA.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
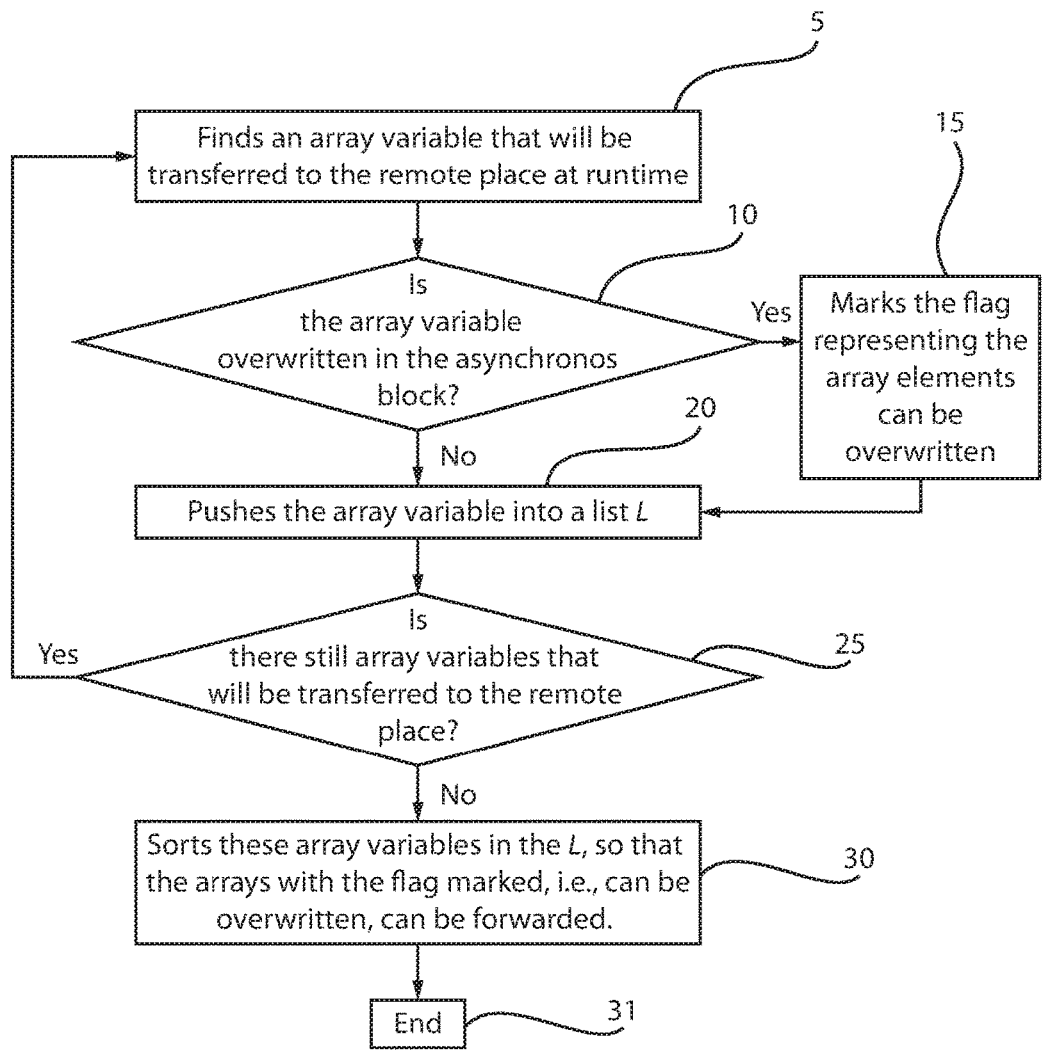
FIG. 1 is a flow diagram illustrating an exemplary method for transferring data by RDMA at static compilation time, in accordance with an embodiment of the present principles.

The methods, systems and computer program products relate to computing with remote direct memory access (RDMA) and the X10 language. As indicated, RDMA bypasses the operating systems of the computer environments involved in the transfer of data (e.g., the local and remote places), which may advantageously decrease the workload on the processors and networks of a computing environment. RDMA implements a transport protocol in the network interface card (NIC) hardware and supports a feature called zero-copy networking. Zero-copy networking makes it possible to read data directly from the main memory of one computer and write that data directly to the main memory of the other computer. RDMA supports zero-copy networking by enabling the network adapter to transfer data directly to or from application memory, eliminating the need to copy data between application memory and the data buffers in the operating system. Such transfers require no work to be done by CPUs, caches, or context switches, and transfers continue in parallel with other system operations. When an application performs an RDMA Read or Write request, the application data is delivered directly to the network, reducing latency and enabling fast message transfer. By enabling one network node to directly place information in another network node's memory with minimal demands on memory bus bandwidth and processor overhead, RDMA operations can attain high throughput and with low network latency. RDMA has proven useful in applications that involve high-speed clusters and data center networks. RDMA permits high-throughput, low-latency networking, which is especially useful in massively parallel computer clusters.

In the X10 computing language, an X10 "place" is a repository for data and activities, corresponding loosely to a process or a processor. A place may be local and a place may be remote. The activities running in a place may access data items located at a local place with the efficiency of on-chip access. On the other hand, accessing data stored in other places may take orders of magnitude longer. In X10, objects cannot be referred to directly if they are found at other places, e.g., remote places. Instead, when a remote place needs to use an object, the object is copied from where it is stored, e.g., a local place, for use in the remote place. The at statement in X10 allows for copying of objects. For example, for the statement "at(p) {S}", the data that is defined outside of at and that is used in S (that is, to execute S) is copied to a remote place p. An activity executing "at(p) {S}" suspends execution in the current place. The object graph G at the current place whose roots are all the variables V used in S is serialized, and transmitted to place p, deserialized (creating a graph G' isomorphic to G), an environment is created with the variables V bound to the corresponding roots in G', and S executed at p in this environment. On local termination of S, computation resumes after "at(p) {S}" in the original location. Because of this ability to shift the current place, at is said to be a place-shifting operation. The at instruction is the only control construct related to places in X10.

The data just before the at body is executed is copied to a remote place. To realize this feature, when the X10 compiler converts X10 code to Java/C++ code, at is converted to a method invocation of runAt, and the data that will be copied to a remote place is given as the arguments of the runAt method. An a sync spawns a new thread of control that operates asynchronously with other threads. An async may use an atomic operation to execute a set of operations on cells located in the current place, as if in a single step. It may use the at operation to switch the place of execution.

"Globalref" typically means in the X10 language that an Object can be remotely referenced from other places. The typical operation on a PlaceLocalHandle is to use it to access an object on the current place. The GlobalRef and PlaceLocalHandle in X10 enable not to copy data. However, significant code refactoring is needed to use GlobalRef and PlaceLocalHandle. Another approach not to copy unnecessary data is to use scalar replacement, which is not suitable for remote places.

In the methods, systems and computer program products that are disclosed herein, the RDMA process can be used to find large arrays that are transferred to remote places, and execute zero-copy with RDMA for transferring such data. The methods, systems and computer program products disclosed herein use the X10 computing language, but do not employ GlobalRef and PlaceLocalHandle. The environment used with the methods systems and computer program products that are disclosed herein employing RDMA may be a parallel active messaging interface (PAMI). PAMI is a messaging API that supports both point-to-point and collective communications. PAMI exploits the low-level user space interface to the Host Fabric Interface and TCP/IP using UDP sockets.

When using RDMA, a destination address at the remote place is needed to transfer data. Current X10 provides data transfer with a PUSH-style, that is, pushing data from the local place to remote places. However, the PUSH-style cannot obtain the destination address only from the local place. The data just before at is executed has to be transferred to the remote place. In some embodiments, the methods, systems and computer program products disclosed herein help to provide that the transferred data cannot be rewritten in the asynchronous execution at the local place while the data is transferred to the remote places with RDMA. Asynchronous execution is a means of parallel execution in which a unit of work runs separately from the main application thread and notifies the calling thread of its completion, failure or progress. In some embodiments, the methods, systems and computer program products of the present disclosure provide that the ability to find which code in the remote place would rewrite the transferred data. The methods, systems and computer program products are now described with greater detail referring to FIGS. 1-8.

Figure 2:
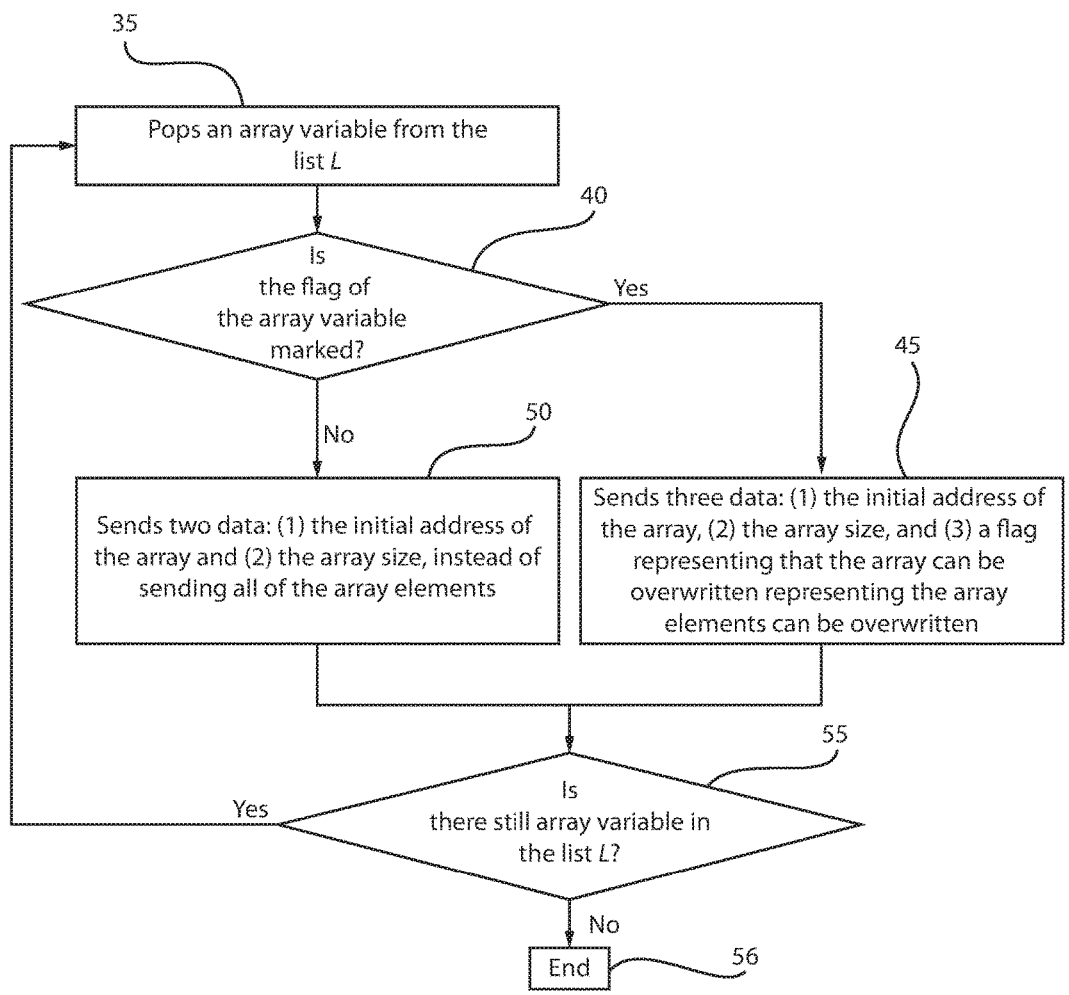
FIG. 2 is a flow diagram illustrating an exemplary method for transferring data by RDMA in local place runtime, in accordance with an embodiment of the present principles.
Figure 3:
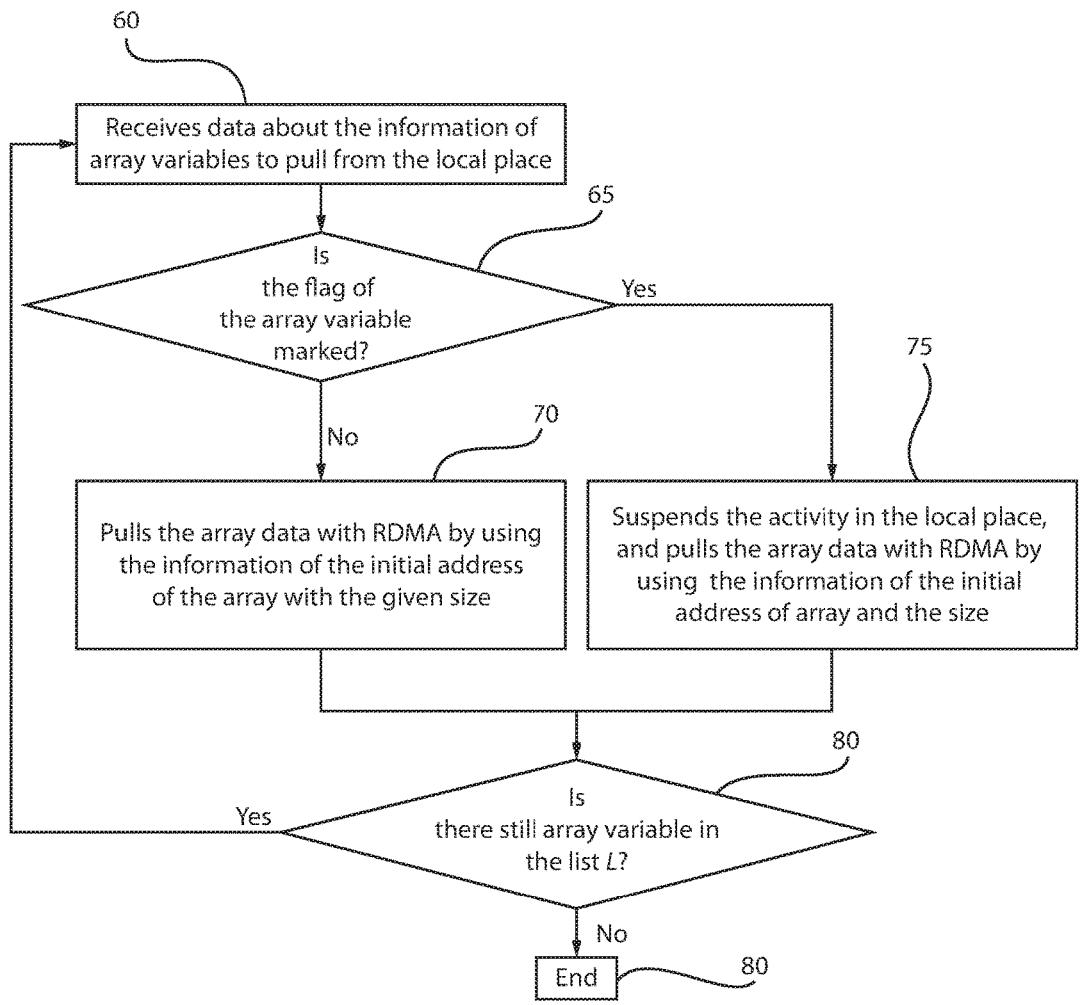
FIG. 3 is a flow diagram illustrating an exemplary method for transferring data by RDMA in the remote place at runtime, in accordance with an embodiment of the present principles.

Referring to FIGS. 1-3, in some embodiments, a method is provided to check whether array data can be overwritten before finishing the data transfer by investigating the asynchronous blocks in the local place at the start compilation time, and if there is no possibility of data overwriting, to execute the data transfer with the Pull-style of RDMA.

In pull-type RDMA, the copying of data occurs in response to a request made by the remote side to the local side. Because the X10 language provides the language constructs to realize asynchronous execution, the X10 language enables finding asynchronous blocks of data. Asynchronous execution can be defined by using the async block such as "async { . . . }", where the following code block "{ . . . }" are executed asynchronously. The asynchronous block can be easily found because the code block followed by the "async" is the one. When the async block is executed at runtime, it depends on the X10 runtime scheduling when the asynchronous block is executed. If it is necessary to guarantee when to finish the execution, another language construct named "finish" is used.

Referring to FIG. 1, in one embodiment, at the static compilation time, the method may begin at step 5 with finding array variables that will be transferred to the remote places at runtime. The X10 language provides the language constructs to realize asynchronous execution, and therefore can find asynchronous blocks.

Examples of array variables include headers, address blocks (addr1, addr2, addr3) of a given size and blocks of data. For example in X10, a fixed size of one dimensional array is represented by using the Rail type such as "val r=new Rail[Long](SIZE)", where the variable r is initialized by the one dimensional array of the Long type with the fixed size SIZE". The variables to be copied to the remote places are found in the local place at static compilation time by finding arrays that are defined outside at and used inside at.

In some embodiments, the array variables are defined outside at block and used inside at block. When the array variables are defined before the at block, the objects representing these variable are allocated in the local host. In contrast, when the array variables are used inside the at block, the objects representing these variables need to be copied from the local host before the actual use in the remote host. The method may classify the array variables into overwritten or read-only variables by checking whether the array elements are overwritten in the asynchronous blocks. For example, a determination is made whether the array variable is overwritten in the asynchronous block at step 10. In some embodiments, following the determination that the array variable is overwritten, the method may continue by marking with flags representing the array elements that can be overwritten at step 15. Thereafter, in some embodiments, the method may continue with push the array variables that are not overwritten in the asynchronous block, i.e., not flagged in step 15, into the list L at step 20. If the array variable is not overwritten in the asynchronous block at step 10, the method may continue to push the array variables into the list L at step 20. In one embodiment, the array variables including data marked with flag to be overwritten are pushed to a list L in an order that said array variables marked with said flag to be overwritten are before said array variables that are read only, wherein by processing the array variables marked with said flag to be overwritten shortens pause time by suspending activity in the local place.

At step 25, a determination is made whether there is still array variables that will be transferred to the remote place that have not been checked to determine if the array variable was overwritten in the asynchronous block. If there are still array variables that having not been checked to determine if the array variable was overwritten in the asynchronous block, the method goes back to repeat step 5 followed by the sequence that may include steps 10, 15 and 20. In some embodiments, the method may repeat for all the array variables that will be transferred.

Still referring to FIG. 1, if multiple array variables exist in the list L, the method continues with sorting the array variables so that the arrays that will be overwritten can be forwarded at step 30.

Referring to FIG. 2, at runtime, before sending data from the local place to the remote place, the method may pop an array variable from the list L at step 35. Pop means to return the initial element stored in the list and removes the element from the list. The list L is provided by steps 20 and 30 of the static compilation time portion of the method, as described above with reference to FIG. 1. The process continues with determining whether the flag of the variable has been marked at step 40. If the flag of the variable has not been marked, the array variable is read only. In some embodiments, if the array variable is read-only, the method may continue by sending two data types at step 50. The type types of data being sent at step 50 may include (1) the initial address of the array and (2) the array size. It is noted that the method may send only this information from the array instead of sending all of the array elements. Referring back to step 40, if the flag of the variable has been mark, and if the array variable can be overwritten, sends three type of data at step 45. In some examples, the types of data being sent at step 45 may include: (1) the initial address of the array, (2) the array size, and (3) a flag representing that the array can be overwritten. It is noted that the method may send only this information from the array instead of sending all of the array elements.

The method may still continue with determining if there is a still an array variable in the list L at step 55. If no variables are left in the listing L, the procedure in the local place at runtime may end at step 56. If variables are left in the listing at step 55, the procedure in the local place at runtime goes back to repeat step 5 followed by the sequence that may include steps 10, 15 and 20. In some embodiments, the method may repeat until there are not more array variables in the list L, at which the procedure for run time at the local place ends at step 56.

When sending an array of a fixed size with an object data type such as Rail[Any], the X10 compiler serializes each element of the array before sending the data to a remote place. Thus, for each array element of the array, only the necessary data is extracted from the element and the extracted data is written into the byte stream by scatter/gather.

Referring to FIG. 3, which is a flow chart of the procedure in the remote place at runtime, the procedure at the remote place may begin with receiving data about the information of array variables to pull from the local place at step 60. Once the data is received, the flag for the array is checked to see if the array variables are marked at step 65. For example, the flag for the array can be checked by checking one bit in the array information that are sent from the local host. If the flag that represents the array is writable is not set, the method may continue by pulling the array data with RDMA by using the information of the initial address of the array with the given size at step 70. If the flag that represents the array can be overwritten is set, the method suspends the activity in the local place, and pulls the array data with RDMA by using the information of the initial address of array and the size at step 75. In a following step, a determination is made if there is still data to pull from the local place at step 80, which can be done by checking list L. If data is still available to be pulled from the local place to the remote place, the procedure may continue by going back to repeat step 60 followed by the sequence that may include steps 65, 70 and 75. In some embodiments, the method may repeat until there are not more array variables in the list L, at which the procedure for run time at the local place ends at step 56.

In some embodiments, in the remote host that receives transferred data, each element of the array is reconstructed from the byte stream in a deserialization step. At runtime in the local host, the actual addresses and sizes (e.g., addr1, size1, addr2, size2, etc.) of the transferred objects for the variables are checked. The data is classified into necessary data (intended for transfer and unnecessary data (e.g., garbage data).

Figure 4:
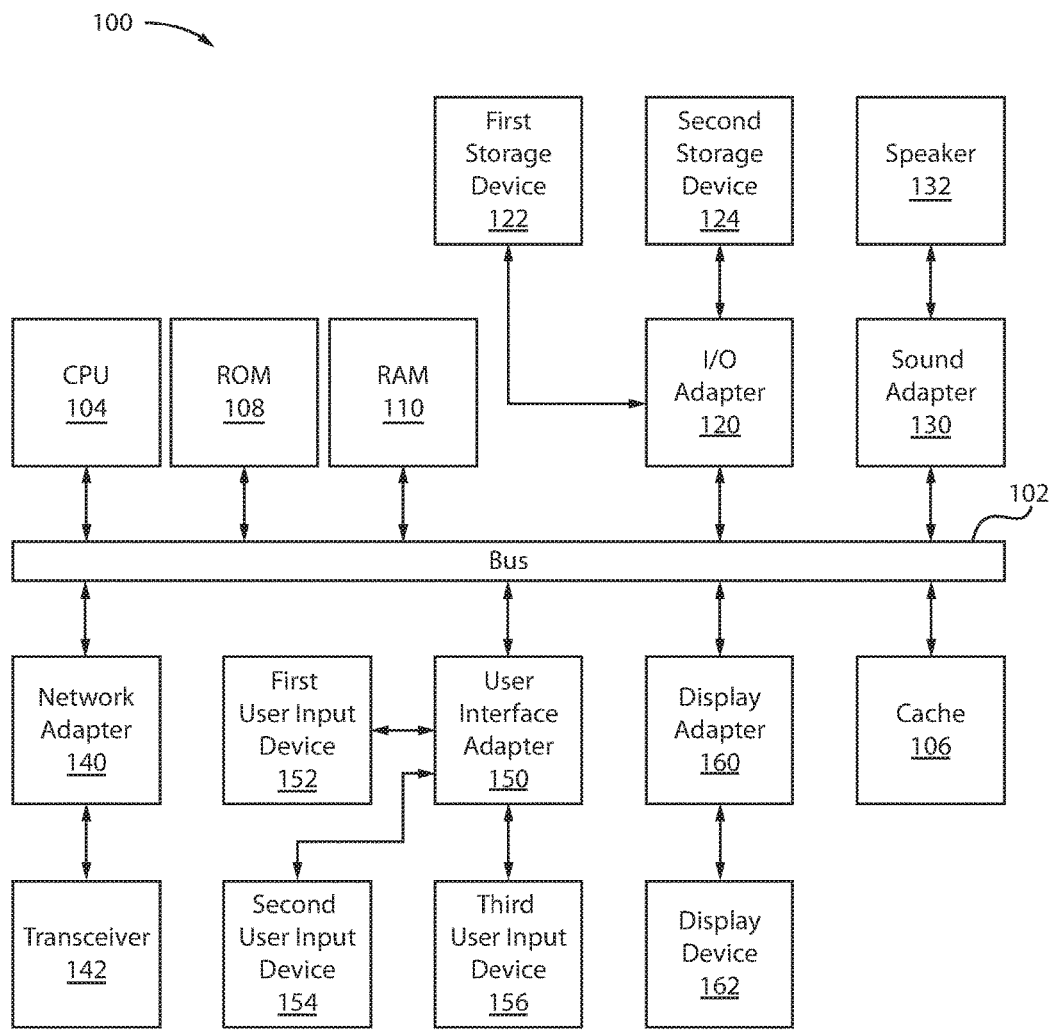
FIG. 4 is a block diagram of a system for RDMA based on static analysis of asynchronous blocks, in accordance with one embodiment of the present disclosure.
Figure 5:
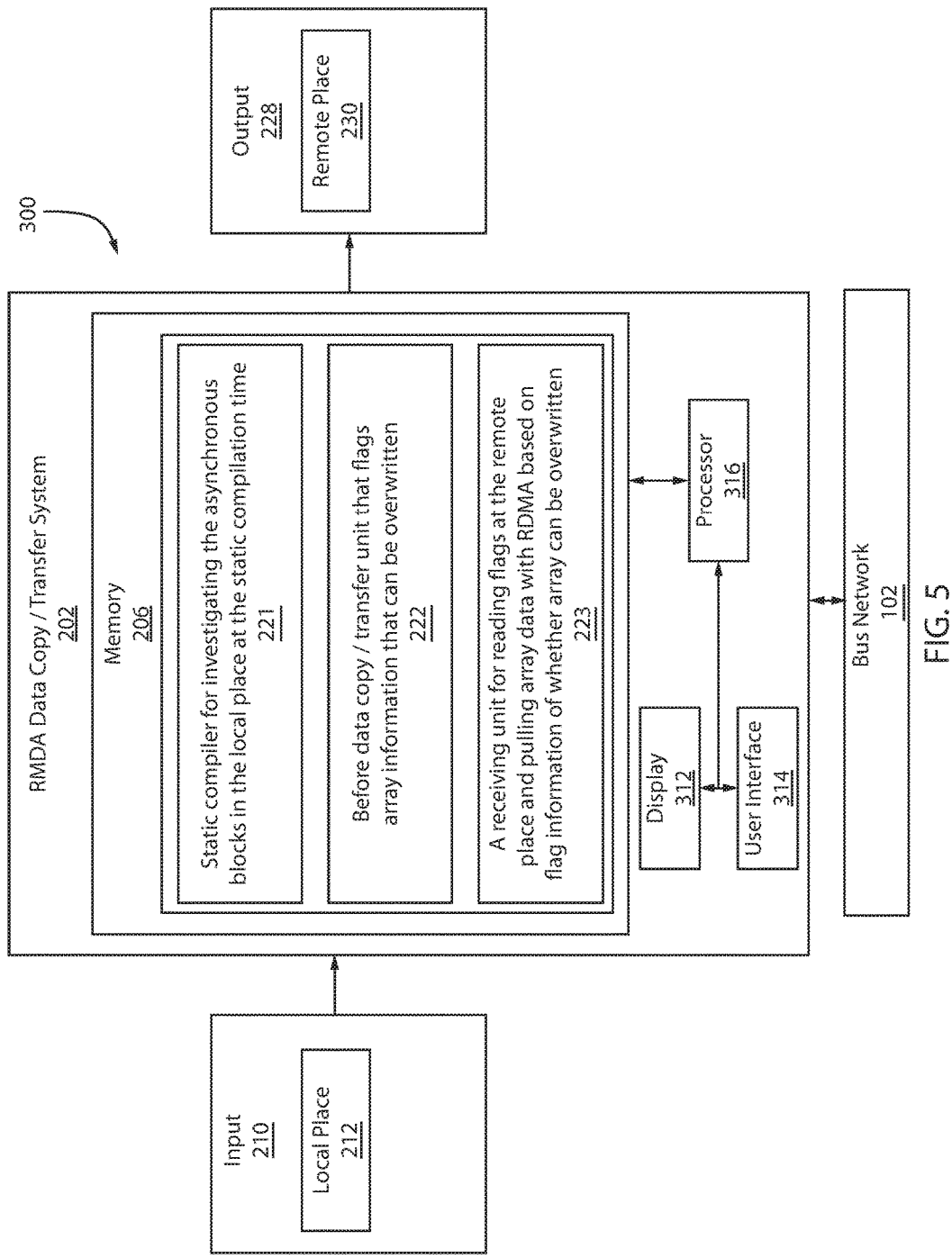
FIG. 5 shows an exemplary processing system to which the present principles may be applied, in accordance with an embodiment of the present principles.

Referring to FIGS. 4 and 5, in accordance with another aspect of the present disclosure, a system is provided for RDMA based on static analysis of asynchronous blocks of data.

FIG. 4 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that system 200 described below with respect to FIG. 5 is a system for implementing respective embodiments of the present principles. Part or all of processing system 100 may be implemented in one or more of the elements of system 200. Further, it is to be appreciated that processing system 100 may perform at least part of the method described herein including, for example, at least part of method of FIG. 1.

FIG. 5 shows an exemplary system 200 for RDMA that is based on static analysis of asynchronous blocks of data, in accordance with at least one embodiment of the present principles. The system 200 includes a RDMA data transfer system 202 that includes one or more processors 204 and memory 206 for storing applications, modules and other data. In one embodiment, the memory unit 206 includes a large number of memory blocks.

The RDMA data transfer system 202 may include a static compiler 221 for investigating the asynchronous blocks in the local place at the static compilation time; a before data copy/transfer unit 222 that flags array information that can be overwritten; and a receiving unit 223 for reading flags at the remote place and pulling array data with RDMA based on flag information of whether array can be overwritten. Further details regarding the static compiler 221 and its function are provided above in the description of the flow chart for the procedure at static compilation time that is provided above with reference to FIG. 1. Further details regarding the before data copy/transfer unit 222 and its function are provided in the above description of the flow chart for the procedure at the local place at runtime that is provided above with reference to FIG. 2. Further details regarding the receiving unit 223 for reading flags at the remote place and pulling array data with RDMA based on flag information of whether array can be overwritten is found above with reference to FIG. 3. As noted above, FIG. 3 provides one embodiment of a procedure for sending data to the remote place at runtime.

The system 200 may also include one or more displays 206 for viewing content. The display 206 may permit a user to interact with the system and its components and functions. This may be facilitated by the inclusion of a user interface 208, which may include a mouse, joystick, or any other peripheral or control to permit user interaction with the system and/or its devices. It should be understood that the components and functions of the system may be represented as one or more discrete systems or workstations, or may be integrated as part of a larger system or workstation. System 200 is depicted as a computer-implemented approach to RDMA based on static analysis of asynchronous blocks, resulting in faster processing time, lower system latency and more efficient use of memory space.

The system 200 receives input 210, which may include data and data objects in a memory array found in a local place 212 that are to be copied and transferred to a remote place 230. Input further may further include information about the data being transferred, such as for example the address headers of the data stored in the memory blocks of the local place 212.

The input 210 to the system 200 may provide the data to the static compiler 221 for investigating the asynchronous blocks in the local place at the static compilation time. This can provide that the static compiler finds the array variables that will be transferred to the remote places at runtime. The system 200 can check whether array data can be overwritten before finishing the data transfer by investigating the asynchronous blocks in the local place at the static compilation time; and using the before data copy/transfer unit 222 and the receiving unit 223 for reading flags at the remote place and pulling array data with RDMA can determine that when there is no possibility of data overwriting when to execute the data transfer with the pull-style RDMA.

Instructions can also be sent to the local place by the before data copy/transfer unit 222 that flags array information that can be overwritten. For example, the before data copy/transfer unit 222 can determining whether the flag of the variable has been marked at step 40 of the method described above with reference to FIG. 1. If the flag of the variable has not been marked, the array variable is read only. In some embodiments, if the array variable is read-only, the before data copy/transfer unit 222 can instruct the local place to sending two data types at step 50 of the method described above with reference to FIG. 1. The type types of data being sent at step 50 may include (1) the initial address of the array and (2) the array size. It is noted that the local site as instructed by the before data copy/transfer unit 222 may send only this information from the array instead of sending all of the array elements. Referring back to step 40, if the flag of the variable has been mark, and if the array variable can be overwritten, the local place can sends three type of data at step 45 as instructed by the before data copy/transfer unit 222. In some examples, the types of data being sent at step 45 may include: (1) the initial address of the array, (2) the array size, and (3) a flag representing that the array can be overwritten. It is noted that the method may send only this information from the array instead of sending all of the array elements.

Data is transmitted by the system 200 as output 228 to the remote place 230. The remote place 230 receives the data sent by the system 200 as output. The remote place 230 determines whether to pull the array data with RDMA by using the information of the initial address of the array with the given size using the receiving unit 223 for reading flags at the remote place and pulling array data with RDMA of the system 200. The remote place may use the receiving unit 223 to determine that when the flag that represents the array can be overwritten is set that the activity in the local place can be suspended, and pulls the array data with RDMA by using the information of the initial address of array and the size.

In the embodiment shown in FIG. 5, the elements thereof are interconnected by bus(es)/network(s) 102, which may integrate with the system depicted in FIG. 4. However, in other embodiments, other types of connections can also be used. Moreover, in an embodiment, at least one of the elements of system 200 is processor-based, e.g., hardware processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

The above embodiment of system 200 is merely exemplary. Variations of this embodiment and other embodiments altogether that implement the present principles are within the scope of the present disclosure. Likewise, the functions of one or more of the above described units and modules can be combined into one or more of the other units and modules.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
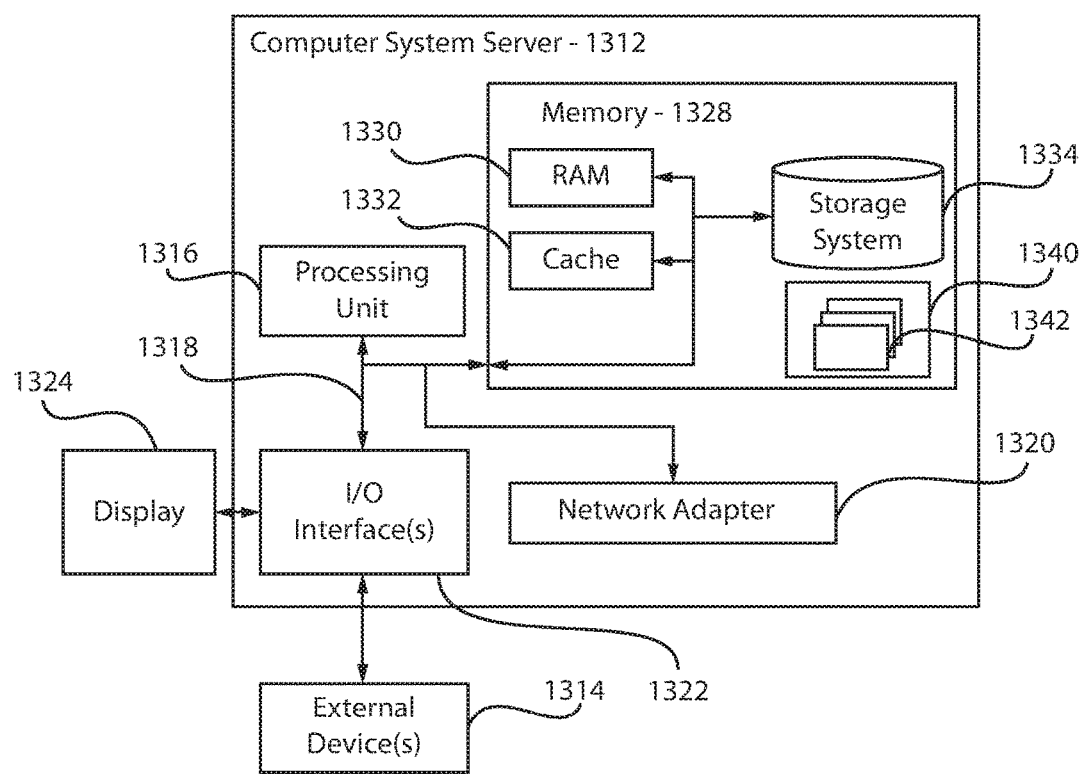
FIG. 6 depicts a cloud computing node according to an embodiment of the present disclosure.

Referring now to FIG. 6, a schematic of an example of a cloud computing node 1310 is shown. Cloud computing node 1310 is only one example of a suitable cloud computing node and is not intended to suggest any limitation as to the scope of use or functionality of embodiments of the invention described herein. Regardless, cloud computing node 1310 is capable of being implemented and/or performing any of the functionality set forth hereinabove.

In cloud computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 1312 in cloud computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As described above, memory 1328 may include at least one program product having a set (e.g., at least one) of program modules that are configured to carry out the functions of embodiments of the present disclosure, as described with reference to FIGS. 1-3.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein. For example, the program modules 1342 can include the modules described with reference to FIG. 3, e.g., the modules for a static compiler 221 for investigating the asynchronous blocks in the local place at the static compilation time; a before data copy/transfer unit 222 that flags array information that can be overwritten; and a receiving unit 223 for reading flags at the remote place and pulling array data with RDMA based on flag information of whether array can be overwritten.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

Figure 7:
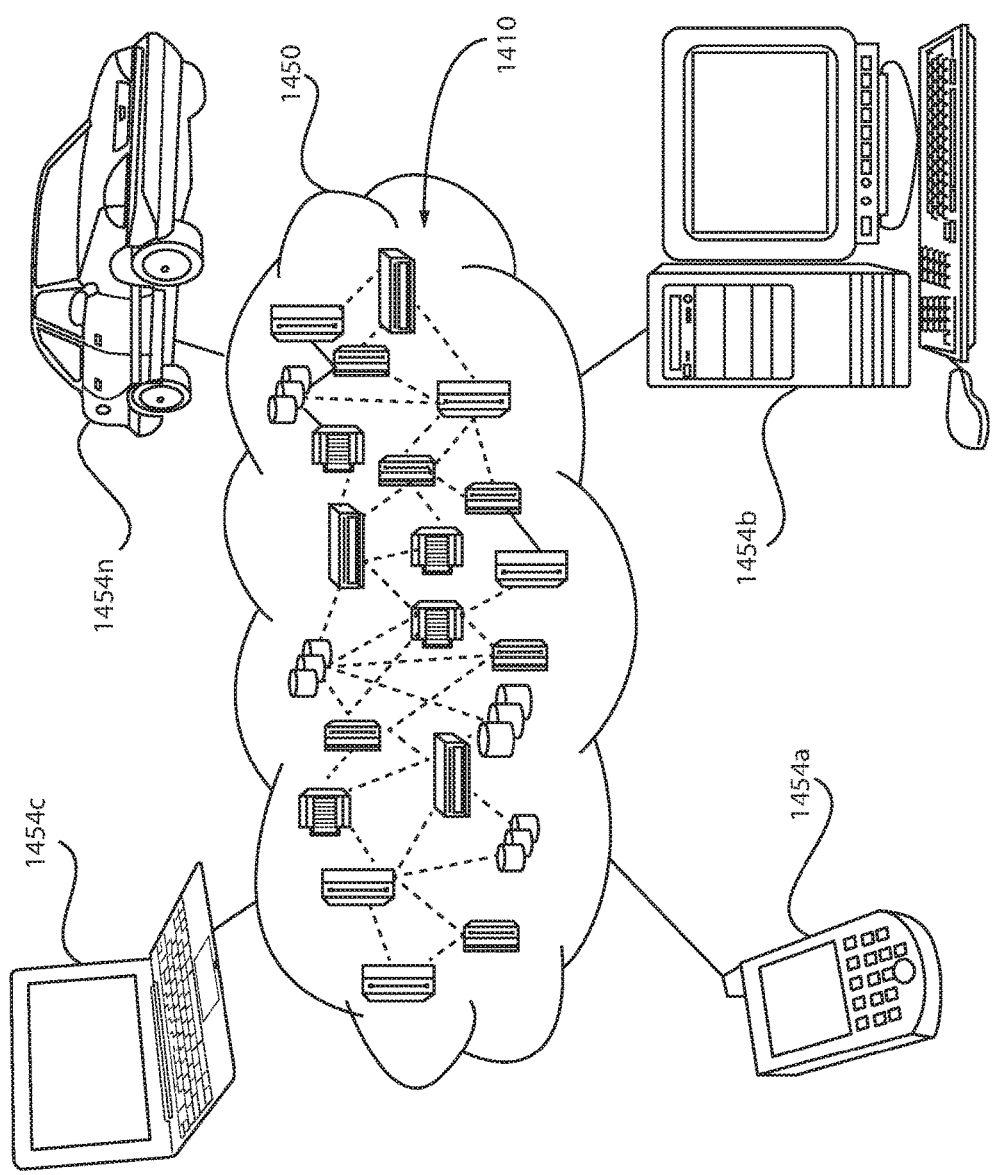
FIG. 7 depicts a cloud computing environment according to an embodiment of the present disclosure.

Referring now to FIG. 7, illustrative cloud computing environment 1450 is depicted. As shown, cloud computing environment 1450 comprises one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 7 are intended to be illustrative only and that computing nodes 1410 and cloud computing environment 1450 can communicate with any type of computerized device over any type of network and/or network addressable connection (e.g., using a web browser).

Figure 8:
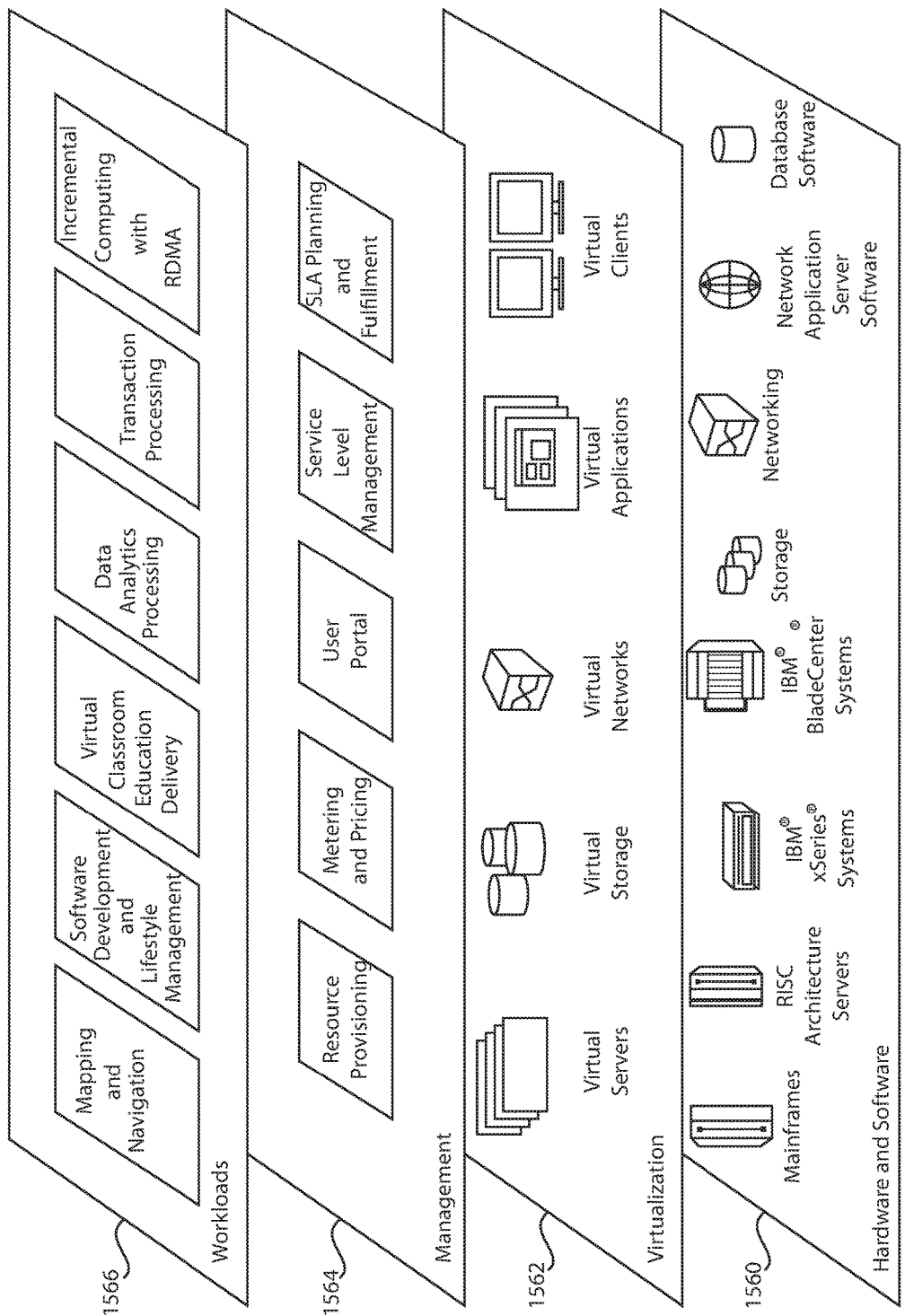
FIG. 8 depicts abstraction model layers according to an embodiment of the present disclosure.

Referring now to FIG. 8, a set of functional abstraction layers provided by cloud computing environment 1550 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1560 includes hardware and software components.

Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and computing with RDMA in accordance with the method described in FIG. 1.

Having described preferred embodiments of a system and method and computer program product for determining trends in patented technology, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method of copying and transferring arrays of data by remote data memory access, comprising:
   identifying data arrays that are to be transferred from a local place to a remote place for use by an activity, the activity being an asynchronous execution at the remote place of a thread of a main application thread executed at the local place;
   determining a subset of the data arrays that will be overwritten at the local place before finishing a transfer of the data arrays to the remote place as overwritten arrays and other data arrays to be transferred to the remote place as read-only arrays by analyzing asynchronous blocks in the local place at a start compilation time using a static compiler;
   queuing the overwritten arrays and the read-only arrays for transferring to the remote place in an order selected to shorten pause time of the local place; and
   executing transfer of the data arrays from the local place to the remote place with a pull type remote direct memory access (RDMA).

2. The method of claim 1, wherein the pull type RDMA includes copying of data in response to a request made by the remote side to the local side.

3. The method of claim 1, wherein an X10 language provides language constructs to realize asynchronous execution, and identify said asynchronous blocks in the data arrays at the local place.

4. The method of claim 1, wherein said determining a subset of the data arrays that will be overwritten further comprises determining whether the data arrays are overwritten in the asynchronous blocks.

5. The method of claim 4, wherein the overwritten arrays are marked with a flag and the read-only arrays are not marked with the flag.

6. The method of claim 5, wherein the data arrays marked with the flag arranged in the order that the data arrays marked with the flag are arranged before the read-only arrays, wherein by processing the data arrays marked with the flag before the read-only data arrays shortens pause time by suspending activity in the local place.

7. The method of claim 6, wherein at the local place executing transfer of the data arrays including read-only data arrays comprises sending two data types from the local place to the remote place including an initial address, and an array size.

8. The method of claim 7, wherein at the local place, executing transfer of the data arrays including overwritten arrays comprises sending three data types from the local place to the remote place for each overwritten array including an initial address, the array size, and the flag.

9. The method of claim 8, wherein during executing transfer of the data arrays from the local place to the remote place, the remote place receives data about the data arrays to pull from the local place.

10. The method of claim 8, wherein during executing transfer of the data arrays from the local place to the remote place, the remote place pulls the read-only arrays with RDMA by using the initial address with the array size, when the flag is not set.

11. The method of claim 8, wherein during executing transfer of the data arrays from the local place to the remote place, the remote place suspends the activity in the local place, and pulls the overwritten arrays with RDMA by using the initial address and the array size, when the flag is set.

12. A system for transferring arrays of data objects by remote data memory access, comprising:
   one or more processors including memory that processes and stores a quantity of data to be copied and transferred from a local place to a remote place;
   a static compiler for identifying data arrays in the local place that are to be used by an activity executed at a remote place, the activity being an asynchronous execution at the remote place of a thread of a main application thread executed at the local place, and determining a subset of the data arrays that are to be overwritten at the local place before finishing a transfer of the data arrays as overwritten arrays and other data arrays to be transferred to the remote place as read-only arrays by analyzing asynchronous blocks in the local place at a start compilation time;
   a before data copy/transfer unit that flags information of data arrays that are identified as overwritten arrays; and a receiving unit for reading flags at the remote place and pulling the data arrays with remote direct memory access (RDMA) based on the flagged information of the overwritten arrays.

13. The system of claim 12, wherein an X10 language provides language constructs to realize asynchronous execution, and identify the asynchronous blocks in the data arrays at the local place, and wherein the determining the subset of the data arrays further comprises determining whether the data arrays are overwritten in the asynchronous blocks.

14. The system of claim 13, wherein the overwritten arrays are marked with a flag and the read-only arrays are not marked with the flag.

15. The system of claim 14, wherein at the local place executing transfer of the data arrays including read-only arrays comprises sending two data types from the local place to the remote place including an initial address, and an array size.

16. The system of claim 15, wherein at the local place executing transfer of the data arrays including overwritten arrays comprises sending three data types from the local place to the remote place including the initial address, the array size, and the flag.

17. The system of claim 16, wherein during the executing transfer of the data arrays from the local place to the remote place, the remote place receives data about the data arrays to pull from the local place.

18. The system of claim 16, wherein during the executing transfer of the data arrays from the local place to the remote place, said remote place pulls the read-only arrays with RDMA by using the initial address with the array size, when the flag is not set.

19. The method of claim 16, wherein during the executing transfer of the data arrays from the local place to the remote place, the remote place suspends the activity in the local place, and pulls the overwritten arrays with RDMA by using the initial address the array size, when the flag is set.

20. A computer program product of transferring arrays of data by remote data memory access, the computer program product comprising a non-transitory computer readable storage medium having program instructions embodied therewith, the program instructions being executable by a computer to cause the computer to perform a method comprising:

identifying data arrays that are to be transferred from a local place to a remote place to be used by an activity, the activity being an asynchronous execution at the remote place of a thread of a main application thread executed at the local place;

determining a subset of the data arrays that are to be overwritten at the local place before finishing a transfer of the data arrays as overwritten arrays and other data arrays to be transferred to the remote place as read-only arrays by analyzing asynchronous blocks in the local place at a start compilation time using a static compiler;

queuing the overwritten arrays and the read-only arrays for transferring to the remote place in an order selected to shorten pause time of the local place; and executing transfer of the data arrays from the local place to the remote place with a pull type RDMA.

* * * * *